(12) United States Patent
Belmonte et al.

(10) Patent No.: US 8,303,189 B2
(45) Date of Patent: Nov. 6, 2012

(54) BEARING SUPPORT JOURNAL AND ASSEMBLY OF SUCH A JOURNAL AND A SEALING SLEEVE

(75) Inventors: Olivier Belmonte, Perthes en Gatinais (FR); Franck Emmanuel Bosco, Sainte Genevieve des Bois (FR); Dimitri Alain Fauron, Paris (FR); Lionel Rene Henri Weller, Champcueil (FR)

(73) Assignee: Snecma, Paris (FR)

( * ) Notice: Subject to any disclaimer, the term of this patent is extended or adjusted under 35 U.S.C. 154(b) by 1015 days.

(21) Appl. No.: 12/478,281

(22) Filed: Jun. 4, 2009

(65) Prior Publication Data

US 2010/0046868 A1     Feb. 25, 2010

(30) Foreign Application Priority Data

Jun. 4, 2008  (FR) ..................................... 08 03095

(51) Int. Cl.
*F16C 33/10* (2006.01)
*F16C 43/00* (2006.01)

(52) U.S. Cl. ........................................ 384/537; 384/286

(58) Field of Classification Search ................ 384/276, 384/286, 287, 289, 290, 291, 462, 465, 466, 384/467, 472, 476, 537; 415/111, 112, 229, 415/230
See application file for complete search history.

(56) References Cited

U.S. PATENT DOCUMENTS 6,338,578 B1 * 1/2002 Adde et al. ..................... 384/540
7,128,529 B2 * 10/2006 Le Jeune et al. ............... 415/229

FOREIGN PATENT DOCUMENTS

| EP | 0 083 266 A1 | 7/1983 |
| EP | 0 335 779 A1 | 10/1989 |
| EP | 1 736 637 A1 | 12/2006 |
| EP | 1 758 429 A1 | 2/2007 |

* cited by examiner

*Primary Examiner* — Phillip A Johnson
(74) *Attorney, Agent, or Firm* — Oblon, Spivak, McClelland, Maier & Neustadt, L.L.P.

(57) ABSTRACT

A bearing support journal for an internal shaft of a gas turbine engine including a device for retaining a sealing sleeve surrounding the shaft is disclosed. The retaining device includes a full radial annular flange formed upstream on an axial cylindrical part of the journal, the full flange being intended to butt axially against a radial annular flange of the sealing sleeve; and a tangential immobilizing device for immobilizing the sealing sleeve with respect to the journal, the tangential immobilizing device being created downstream on the axial cylindrical part of the journal.

21 Claims, 13 Drawing Sheets

BEARING SUPPORT JOURNAL AND ASSEMBLY OF SUCH A JOURNAL AND A SEALING SLEEVE

BACKGROUND OF THE INVENTION AND DESCRIPTION OF THE PRIOR ART

The present invention relates to the field of gas turbine engines and deals more specifically with the operations involved in mounting the engine shaft.

A twin-spool turbojet engine with a front-mounted fan, for example, comprises a low-pressure spool, known as the LP spool, and a high-pressure spool known as the HP spool.

By convention, in the present application, the terms "upstream" and "downstream" are defined with respect to the direction in which air flows through the turbojet engine. Thus, a twin-spool turbojet engine with a front-mounted fan comprises, in the conventional way, from the upstream end downstream, a fan, an LP compressor stage, an HP compressor stage, a combustion chamber, an HP turbine stage and an LP turbine stage.

By convention, in this application, the terms "interior" and "exterior" are defined radially with respect to the axis of the engine. Thus, a cylinder extending along the axis of the engine comprises an interior face facing toward the axis of the engine and an exterior surface, on the opposite side to its interior surface.

The shaft of the LP spool is guided in its rotation in bearings supported by the fixed structure of the engine whereas the shaft of the HP spool is guided by bearings supported by the LP spool, the shafts of the two spools being concentric.

The HP turbine disk is secured to a journal for the mounting of the bearing that allows the HP shaft to rotate with respect to the LP shaft, this bearing being known as bearing "4" in a twin-spool engine with a front-mounted fan.

The LP shaft is housed in a cylindrical sleeve secured to the journal. When the sleeve is mounted in the engine, it is necessary to fix the position of the sleeve with respect to the journal, both axially and tangentially.

To do this, with reference to FIG. 1, the journal 1 comprises an axial cylindrical part 13 on which dog couplings are formed. The dog couplings are in the form of a crenellated radial annular band 20 comprising projecting teeth 21 alternating with crenels 22. Hereinafter, a crenel is defined as being the space between two successive teeth.

Because the dog coupling teeth 21 of the journal 1 are directed inward, that is to say toward the axis of the engine, the dog couplings of the journal will be termed interior dog couplings.

The interior dog couplings of the journal are designed to be in register with dog couplings, known as exterior dog couplings, formed on an annular band of the sleeve, the teeth of the exterior dog couplings being directed outward.

Axial alignment between the teeth of the interior and exterior dog couplings allows the sleeve to be immobilized axially with respect to the journal, the upstream face of the teeth of the exterior dog couplings of the sleeve being in axial abutment against the downstream face of the teeth of the interior dog couplings of the journal. The sleeve is tangentially immobilized by upstream-directed axial engagement teeth formed on the labyrinth ring of the bearing which is mounted downstream of the sleeve. The axial engagement teeth are introduced between the teeth of the interior and exterior dog couplings, thus preventing the sleeve from rotating with respect to the journal about the axis of the engine. A locknut is screwed axially, in the cold state, onto the downstream end of the journal, to keep the sleeve axially and tangentially immobilized.

The axial clamping applied by the locknut to the sleeve leads to high axial stresses on the interior dog couplings of the journal. The sharp edges and short radii of the teeth of the interior dog couplings lead to fatigue in the journal near said edges. The build-up of stresses of various kinds in the upstream part of the journal weakens the journal.

The journal further comprises lubricating ducts placing the oil stored outside the journal in communication with the lubrication space in which the bearing supported by the journal is bathed. These internal lubricating ducts are formed longitudinally in the journal using an EDM (electron-discharge-machining) method. A method such as this has numerous disadvantages. First of all, it leads to an internal mechanical weakening of the machined zone. The thermally affected zone loses its mechanical properties, leading to a potential risk for damage. Further, the internal ducts formed by EDM are difficult to inspect because of their size and location on the component. After they have been formed, they may have internal cracks liable to weaken the journal.

Finally, the internal lubricating ducts open into the lubricating space via radial oil removal ports. The sharp edges of the ports lead to mechanical weaknesses in the journal.

Thus, the journal is the site of a buildup of mechanical fatigue phenomena which are liable to weaken the journal as it operates.

SUMMARY OF THE INVENTION

In order to eliminate these disadvantages, the applicant company is proposing a bearing support journal for an internal shaft of a gas turbine engine comprising a means of retaining a sealing sleeve surrounding said shaft, the retaining means comprising:
- a full radial annular flange formed upstream on an axial cylindrical part of the journal, said full flange being intended to butt axially against a radial annular flange of the sealing sleeve, and
- tangential immobilizing means created downstream on the axial cylindrical part of the journal and intended to immobilize the sealing sleeve tangentially with respect to the journal.

What is meant by a full flange is a continuous flange the radial dimension of which is substantially constant around the journal.

The tangential and axial stresses are spatially separated on the journal, the tangential stresses being located downstream while the axial stresses are located upstream. That advantageously makes it possible to limit the fatigue relative to each type of stress.

As a preference, the tangential immobilizing means are formed at the downstream end of the axial cylindrical part of the journal.

Again as a preference, the tangential immobilizing means are in the form of a crenellated radial annular immobilizing band formed in the interior surface of the journal, said band comprising inwardly directed radial teeth alternating with crenels. The crenels of the crenellated band form indexing means advantageously making it possible to immobilize the sleeve tangentially with respect to the journal.

Still as a preference, locking housings are formed in the crenels of said crenellated radial annular immobilizing band of the journal.

According to another feature of the invention, the journal comprises bearing lubricating ducts in the form of longitudinal slots formed in the interior surface of the journal.

The lubricating ducts are, on the one hand, visible, allowing them to be visually inspected and defects to be detected and, on the other hand accessible to peening tools to make it possible to limit the mechanical fatigue introduced as they are being machined.

As a preference, radial lubricating bores are formed in the interior surface of the journal at the upstream end of the lubricating ducts. Because the ducts are visible, the lubricating bores can be peened in order to reduce the mechanical stresses caused by their sharp edges.

The invention also relates to a gas turbine engine comprising a journal according to the invention.

The invention also relates to an assembly of a journal as set out hereinabove and of a sealing sleeve comprising a radial annular flange, the assembly comprising:

a lubricating ring in surface contact with the interior surface of the journal, which is in axial abutment, along its upstream edge, with a radial annular axial-thrust flange formed on the journal.

The lubricating ring is advantageously able to cover the lubricating ducts of the journal and to guide the removal of bearing lubricating oil.

As a preference, the lubricating ring comprises an annular oil-collecting groove in which radial openings are formed, the groove advantageously placing the lubricating ducts in fluidic communication with the bearing outer ring.

Again as a preference, the lubricating ring comprises cylindrical lands to deaden the vibrations of the engine in operation.

Still as a preference, the assembly comprises a sealing disk, of cylindrical shape, that fits axially into the sealing sleeve downstream thereof, the sealing disk comprising a circumferential radial band comprising upstream-projecting axial teeth which are inserted into openings formed in the radial annular flange of the sealing sleeve.

As a preference, the upstream-projecting axial teeth are in axial abutment against the full flange of the journal.

As a preference, the sealing disk is mounted on the inside of the lubricating ring.

The sealing disk is advantageously able to keep the lubricating oil upstream of its circumferential radial band.

Still as a preference, the assembly comprises an external bearing ring, of cylindrical shape, that fits axially into the sealing disk downstream thereof, the external ring comprising upstream-projecting axial engagement teeth which are engaged between the downstream-projecting axial engagement teeth formed on the circumferential radial band of the sealing disk.

Still as a preference, the bearing outer ring is mounted on the inside of the lubricating ring, thus allowing it to be lubricated in operation.

According to another embodiment of the invention which has not been depicted, the lubricating ring is built into the bearing outer ring.

As a preference, the assembly comprises a locking ring for locking the bearing outer ring, of cylindrical shape, that fits axially into the bearing outer ring, downstream thereof, mounted on the inside of the bearing support journal in order to lock the axial position of the bearing outer ring.

Again as a preference, the locking ring comprises, upstream, interior radial locking teeth that axially immobilize the bearing outer ring and, downstream, exterior radial locking teeth that axially immobilize the lubricating ring.

The locking ring allows the axial position of the outer ring and of the lubricating ring to be fixed.

Still as a preference, locking housings intended to accommodate rotation-proofing pins to lock the tangential position of the bearing outer ring are formed in the downstream transverse face of the locking ring.

As a preference, the assembly comprises an annular immobilizing ring, of cylindrical shape, that fits axially into the bearing outer ring downstream thereof, the immobilizing ring comprising upstream-directed axial immobilizing teeth designed to fix the tangential position of the outer ring with respect to the locking ring.

Again as a preference, the bearing outer ring comprises on its downstream face downstream-projecting axial engagement teeth, each axial immobilizing tooth of the annular immobilizing ring being inserted between an interior radial locking tooth of the locking ring and a downstream-projecting axial engagement tooth of the outer ring.

As a preference, the assembly comprises an axial locknut in axial abutment with the downstream face of the immobilizing ring.

The invention also relates to a gas turbine engine comprising an assembly according to the invention.

BRIEF DESCRIPTION OF THE DRAWINGS

The invention will be better understood with the aid of the attached drawings in which.

DESCRIPTION OF THE PREFERRED EMBODIMENTS

A twin-spool turbojet engine with a front-mounted fan, for example, comprises a low-pressure spool, known as the LP spool, and a high-pressure spool known as the HP spool.

The shaft of the LP spool is guided in rotation about the axis of the engine in bearings supported by the fixed structure of the engine whereas the shaft of the HP spool is guided by bearings supported by the LP spool, the shafts of the two spools being concentric.

Figure 25:
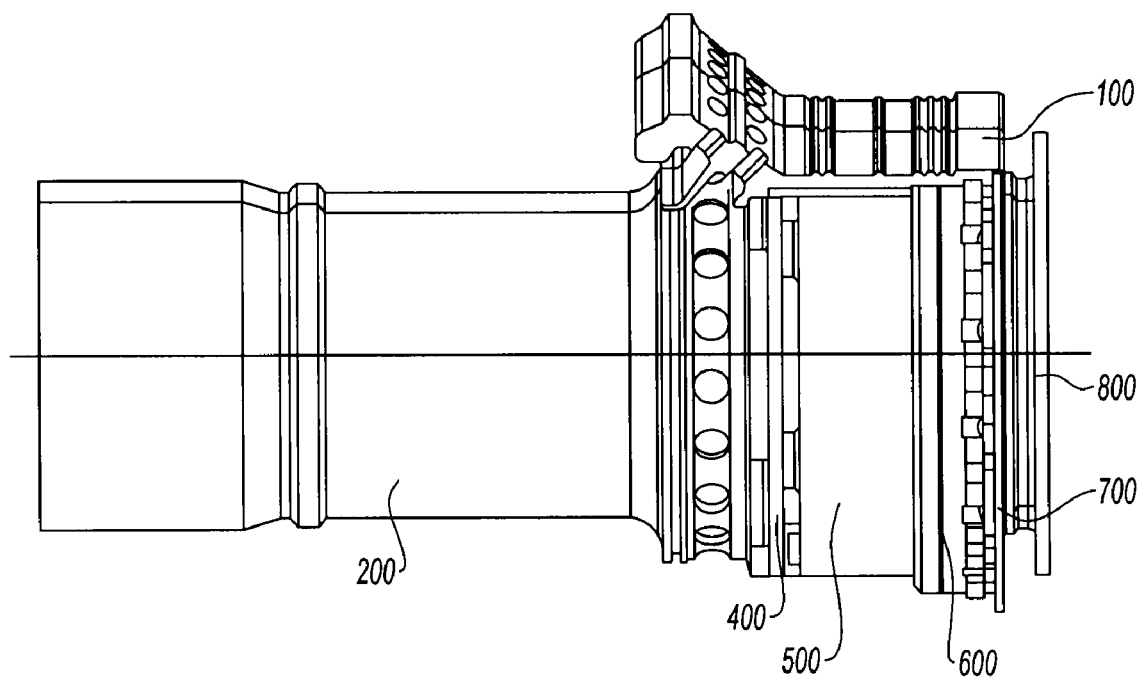
FIG. 25 depicts a side view of FIG. 24 with part in cutaway.

The HP turbine disk is secured to a journal for mounting the bearing that allows the HP shaft to rotate with respect to the LP shaft, via which the HP shaft is supported by the LP shaft. The LP shaft is housed in a cylindrical sealing sleeve 200 secured to the journal 100 as depicted in FIG. 25. The bearing comprises an inner ring, secured to the LP shaft, and an outer ring 500 secured to the journal 100.

Still with reference to FIG. 25, in order to keep the bearing outer ring 500 in position, the sealing sleeve 200, a sealing disk 400 or bearing labyrinth ring 400, the bearing outer ring 500 with a lubricating ring 300, a bearing locking ring 600, an immobilizing ring 700 and a locknut 800 are mounted from the upstream direction downstream on the journal 100. All of these elements are axially and tangentially immobilized by the journal 100.

The various elements of the assembly will now be described individually.

Journal 100

Figure 1:
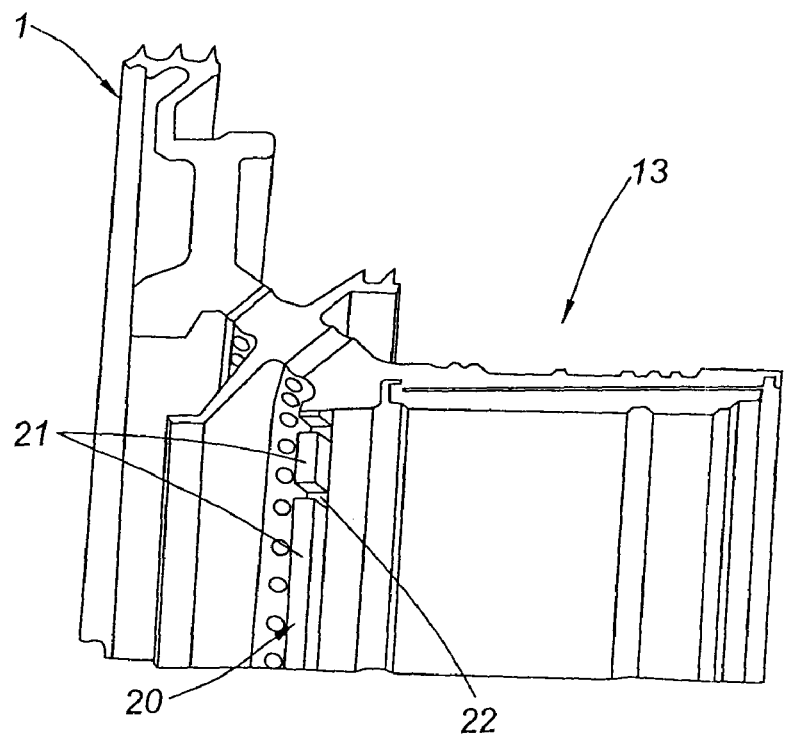
FIG. 1 depicts, in perspective, a sectioned view of a bearing support journal according to the prior art.
Figure 2:
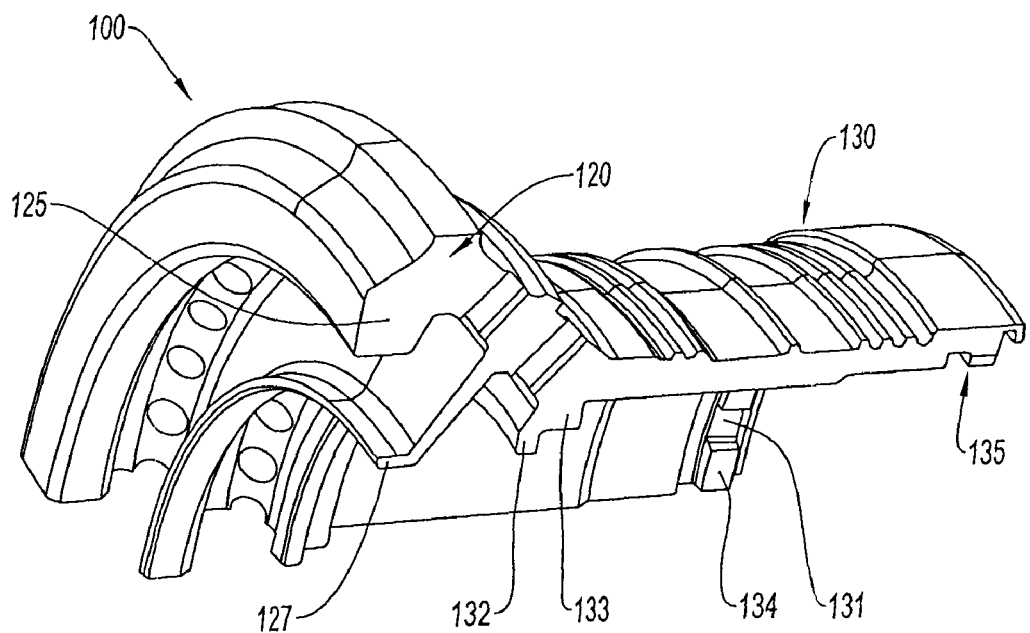
FIG. 2 depicts, in perspective, a partial sectioned view of a bearing support journal according to the invention.
Figure 3:
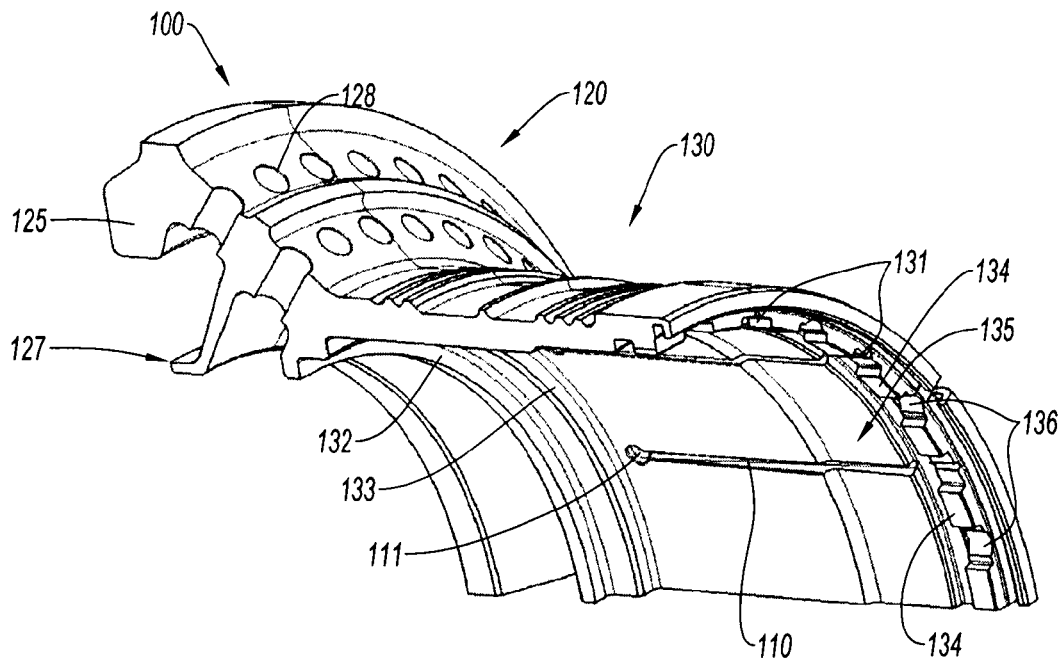
FIG. 3 depicts another partial perspective view of the bearing support journal of FIG. 2.

With reference to FIGS. 2 and 3, the journal 100 is in the form of a component exhibiting symmetry of revolution, widening substantially in the upstream direction and extending along the axis of the engine. The journal 100 comprises, from the upstream end downstream, a radial annular attachment part (not depicted) designed to be attached to a flange of the HP turbine disk, a frustoconical part 120 and a longitudinal cylindrical part 130.

The frustoconical part 120 of the journal 100 comprises a circumferential radial projecting portion 125, that plays a mechanical reinforcement role, directed toward the axis of the engine and intended to transfer the mass of the journal 100 closer to the axis of the engine. The frustoconical part 120 of the journal 100 further comprises an interior frustoconical flange 127 intended to rest against the sealing sleeve 200 through which the LP shaft of the engine passes and form an air manifold. Circumferential ventilation openings 128 are formed in the frustoconical part 120 of the journal 100 to allow for the removal of a cooling airstream that has cooled the HP turbine disk mounted downstream of the journal 100.

The longitudinal cylindrical part 130 of the journal 100 furthest downstream along the journal 100 comprises, at its upstream end, a full radial annular flange 132 hereinafter termed full flange 132. What is meant by a full flange is a continuous flange the radial dimension of which is substantially constant at the circumference of the journal 100. The full flange 132, formed on the interior surface of the journal 100, is directed inward. The full flange 132 is not crenellated and is therefore not mechanically weakened. The full flange 132 is designed to immobilize the sealing sleeve 200 axially while at the same time allowing it to move tangentially. In other words, the sleeve 200 is free to rotate about the axis of the engine.

With reference to FIGS. 2 and 3, the longitudinal cylindrical part 130 of the journal 100 comprises, at its downstream end, tangential immobilizing means in the form of a crenellated radial annular immobilizing band 135 comprising interior radial teeth 134 separated by crenels 131. Locking housings 136 to accept rotation-proofing pins are formed in some of the crenels 131. The radial teeth 134 of the immobilizing band 135 are directed inward. The immobilizing band 135 is designed to allow the sleeve 200 to be indexed with respect to the journal 100, that is to say to immobilize it tangentially. The indexing of the sleeve 200 is indirect here because it is performed via elements that are mounted between the immobilizing band 135 and the sleeve 200.

The full flange 132 and the immobilizing band 135 form a means of retaining the sleeve 200 on the journal 100.

The axial immobilization performed by the full flange 132 at the upstream end, and the tangential immobilization performed by the immobilizing band 135 at the downstream end are advantageously spatially separated along the journal 100. Mechanical stresses caused by these methods of immobilization are thus better distributed over the journal 100. The journal 100 is less liable to be damaged by comparison with a journal according to the prior art. The full flange 132 allows axial load to be spread uniformly without creating any points of weakness.

The longitudinal cylindrical part 130 of the journal 100 further comprises a radial annular axial-thrust flange 133 formed downstream of the full flange 132 and designed to form an axial end stop for the lubricating ring 300. The radial annular axial-thrust flange 133 will hereinafter be known as the lubricating ring flange 133.

In this example, with reference to FIG. 3, the lubricating ring flange 133 is formed with the full flange 132 of the journal 100. It goes without saying that the two flanges 132, 133 could just as well be independent.

The lubricating ring flange 133 and the full flange 132 are, on the whole, in the form of a radial annular band with an annular radial portion offset in the upstream direction. In other words, the lubricating ring flange 133 and the full flange 132 are in the form of two treads of a staircase of which the faces facing in the downstream direction are designed to form axial end stops for the sleeve 200 and for the lubricating ring 300.

With reference to FIG. 3, the journal 100 comprises bearing lubricating ducts 110 in the form of longitudinal slots formed in the interior surface of the journal 100. Radial lubricating bores 111 are formed in the interior surface of the journal 100 at the upstream end of the lubricating ducts 110. Because the lubricating ducts 110 are visible, they can be visually inspected in order to detect any machining defects and repair these accordingly. Furthermore, the lubricating ducts 110 and the radial lubricating bores 111 here are peened in order to enhance their mechanical properties and reduce the stresses connected with their machining.

Sleeve 200

Figure 4:
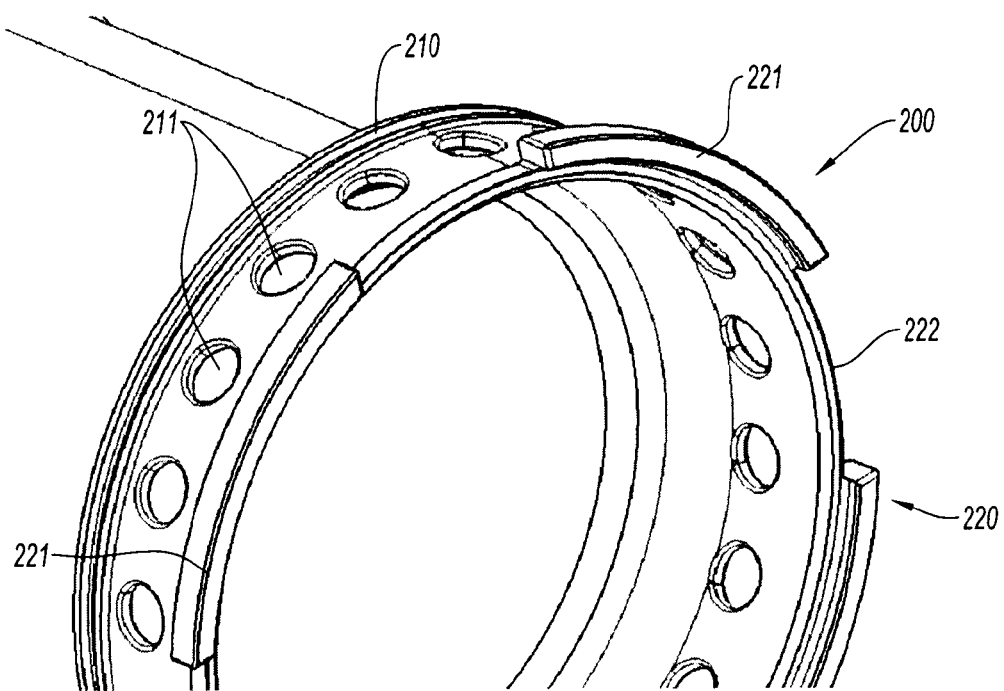
FIG. 4 depicts a perspective view of a sealing sleeve according to the invention.

With reference to FIG. 4, the sealing sleeve 200 is in the form of an annular cylinder extending axially, on the outside of the LP shaft of the engine and on the inside of the journal 100. The sealing sleeve 200, amongst other things, protects the LP shaft against excessive temperatures.

The sealing sleeve 200 comprises, downstream, a cylindrical air circulation part 210 in which circular radial openings 211 are formed circumferentially. The sealing sleeve 200 further comprises, at its downstream end, a crenellated radial annular flange 220 intended to come into axial abutment against the full flange 132 of the journal 100. The crenellated radial annular flange 220 comprises radial axial-thrust teeth 221 separated by indexing crenels 222, the radial teeth 221 being directed outward.

Lubricating Ring 300

Figure 5:
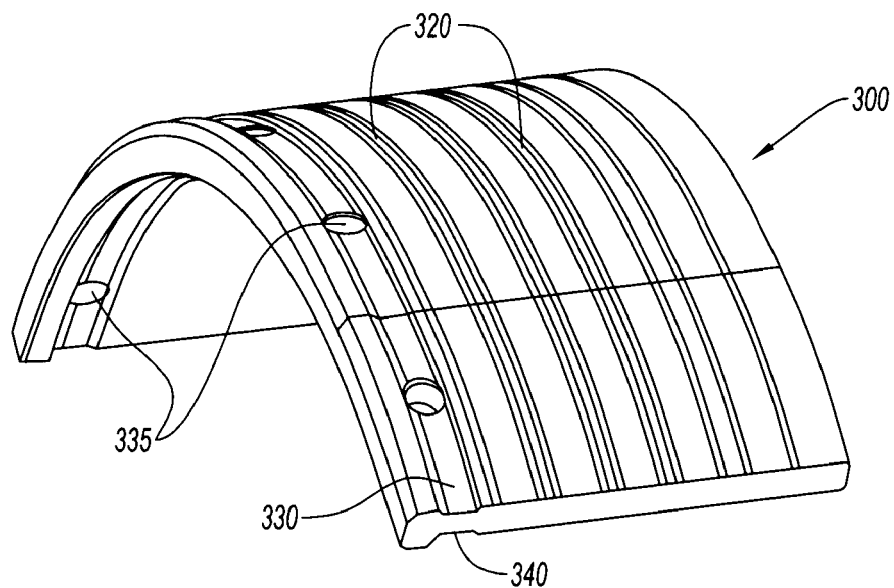
FIG. 5 depicts a partial perspective view of a lubricating ring.

With reference to FIG. 5, the lubricating ring 300 is intended to be housed on the inside of the journal 100, in contact with the interior surface of the journal 100. The lubricating ring 300 is in the form of an axial annular cylinder comprising, on its exterior surface, radial cylindrical lands 320 directed outward and designed to deaden the vibrations of the engine in operation.

The lubricating ring 300 covers the lubricating ducts 110 formed in the interior surface of the journal 100, the lubricating oil thus being advantageously guided between the journal 100 and the lubricating ring 300 through the lubricating slots 110 of the journal 100.

The lubricating ring 300 comprises, near its upstream end, an exterior annular oil-recovery groove 330 formed on its exterior surface and an interior annular oil-recovery groove 340 formed on its interior surface, the interior 340 and exterior 330 grooves being radially aligned. Radial openings 335 are machined in the grooves 330, 340 to place the lubricating oil circulating through the lubricating ducts 110 of the journal 100 in fluidic communication with the bearing mounted on the inside of the lubricating ring 300. The radial openings 335 are, in this example, evenly distributed in the circumferential groove 330, 340 of the lubricating ring 300.

Figure 6:
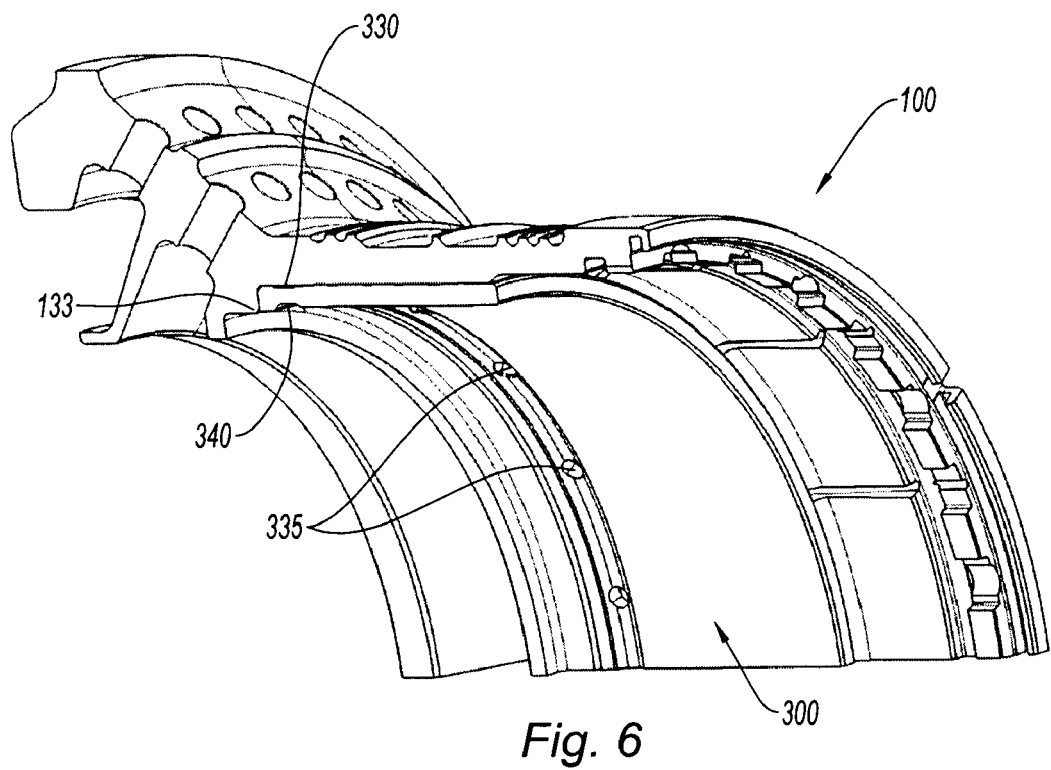
FIG. 6 depicts a perspective view of the mounting of the lubricating ring of FIG. 5 on the journal of FIG. 3.
Figure 7:
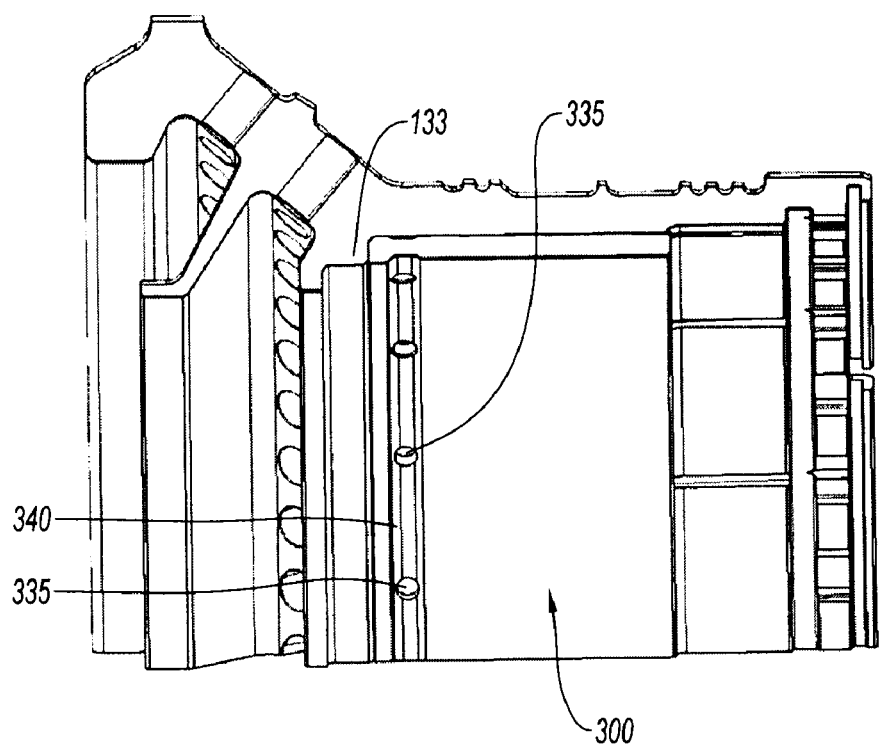
FIG. 7 depicts another perspective view from beneath of the mounting of the lubricating ring of FIG. 5 on the journal of FIG. 3.

When the lubricating ring 300 is mounted with the journal 100, as depicted in FIGS. 6 and 7, the upstream edge of the lubricating ring 300 is in axial abutment against the lubricating ring flange 133 of the journal 100. The lubricating ring 300 is mounted axially from the rear end of the engine, that is to say from the downstream end upstream. The lubricating ring 300 is able to guide the removal of bearing lubricating oil toward the lubricating ducts 110 of the journal 100.

Sealing Disk 400

Figure 8:
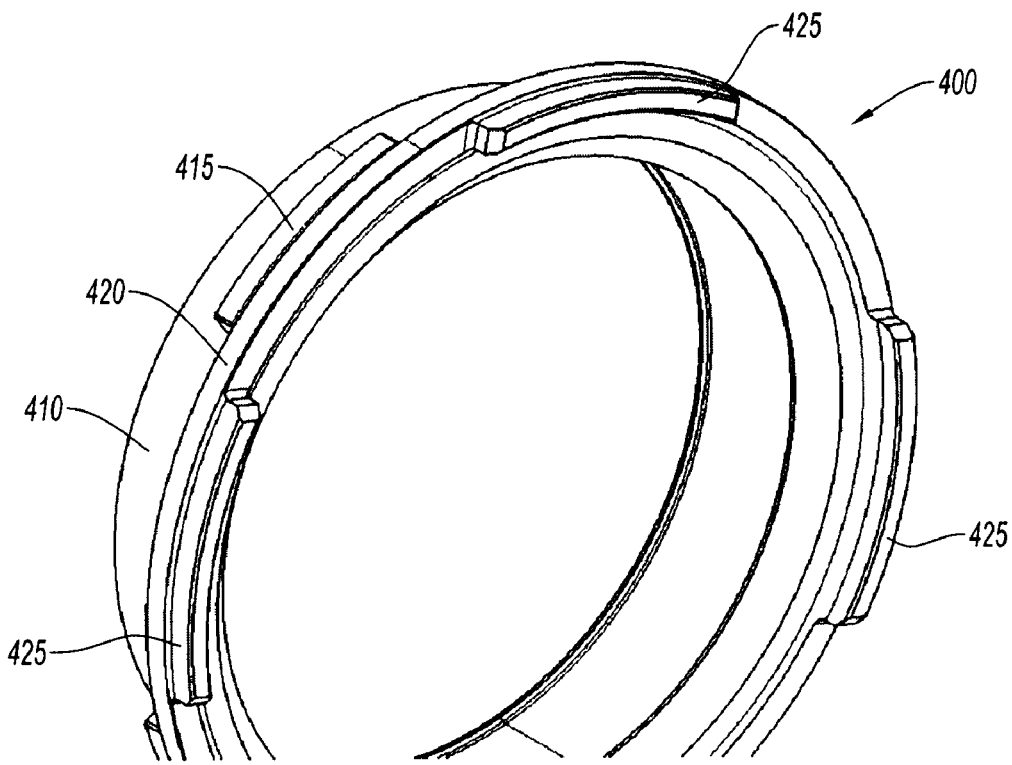
FIG. 8 depicts a perspective view of a sealing disk according to the invention.

With reference to FIG. 8, the sealing disk 400 or bearing labyrinth ring 400 is in the form of an axial annular cylinder 410 comprising, downstream, an outwardly directed circumferential radial band 420. The sealing disk 400, mounted downstream of the sealing sleeve 200, is designed to fit axially into the sealing sleeve 200, on the inside of the lubricating ring 300.

The circumferential radial band 420 of the sealing disk 400 comprises upstream-projecting axial teeth 415 formed on the upstream surface of the band 420 and designed to be in register with the crenels 222 formed in the radial annular band 220 of the sealing sleeve 200. In other words, each upstream-projecting axial tooth 415 of the sealing disk 400 engages between two radial teeth 221 of the radial annular band 220 of the sleeve 200.

The upstream-projecting axial teeth 415 of the sealing disk 400 are in this instance set in with respect to the radial exterior end of the circumferential radial band 420 of the sealing disk 400. In other words, said teeth 415 are not formed in the extension of the exterior surface of the circumferential radial band 420 of the sealing disk 400 but are offset radially inward.

Similarly, the circumferential radial band 420 of the sealing disk 400 comprises downstream-projecting axial teeth 425 formed on the downstream surface of the band 420 and designed to be in register with the bearing outer ring 500 mounted downstream of said sealing disk 400.

The downstream-projecting axial teeth 425 of the sealing disk 400 are here set in with respect to the radial exterior end of the circumferential radial band 420 of the sealing disk 400. In other words, said teeth are not formed in the extension of the exterior surface of the circumferential radial band 420 of the sealing disk 400 but are offset radially inward.

Bearing Outer Ring 500

Figure 9:
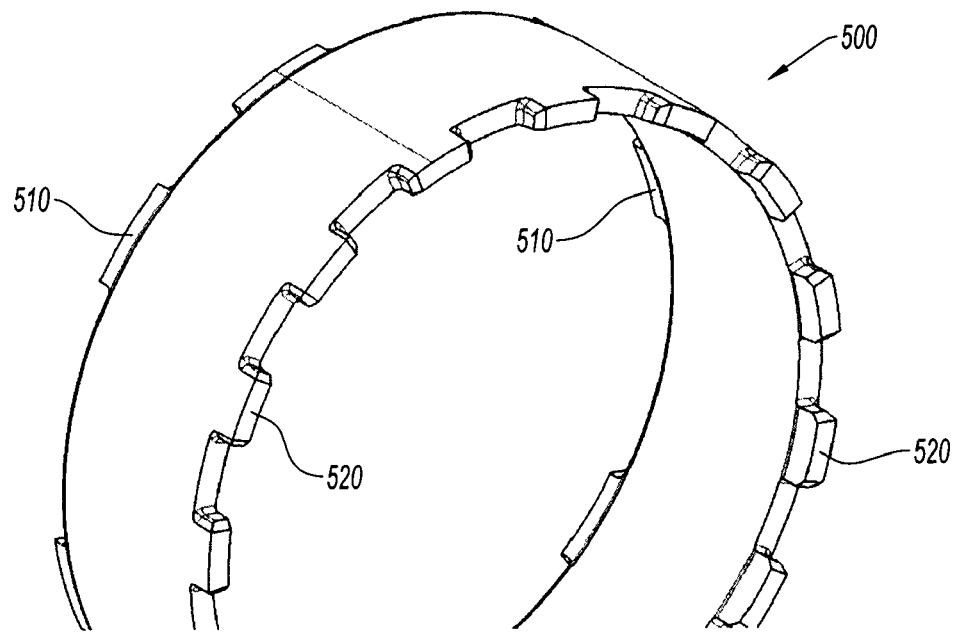
FIG. 9 depicts a perspective view of a bearing outer ring according to the invention.

With reference to FIG. 9, the bearing outer ring 500 mounted downstream of the sealing disk 400 is in the form of an axial annular cylinder designed to fit axially into the sealing disk 400 from the rear end of the engine, the outer ring 500 being mounted on the inside of the lubricating ring 300.

The bearing supporting the HP shaft comprises rollers held between the outer ring 500, which rotates as one with the journal, and the inner ring (not depicted) which rotates as one with the LP shaft of the engine.

The bearing outer ring 500 comprises upstream-projecting upstream axial engagement teeth 510 formed on the upstream face of the outer ring 500 and designed to engage between the downstream-projecting axial teeth 425, formed on the circumferential radial band 420 of the sealing disk 400.

The upstream axial engagement teeth 510 of the outer ring 500 here are set in with respect to the exterior surface of the cylinder which embodies the shape of the outer ring 500. In other words, said upstream axial engagement teeth 510 are not formed in the extension of the exterior surface of the cylinder but are offset radially inward. In this example, the upstream axial engagement teeth 510 have a radial thickness less than that of the cylinder that embodies the shape of the outer ring 500.

The bearing outer ring 500 further comprises downstream-projecting downstream axial engagement teeth 520 formed on the downstream face of the outer ring 500 and designed to engage with the locking ring 600 mounted downstream of said outer ring 500. The downstream-projecting downstream axial engagement teeth 520 here are formed in the extension of the exterior surface of the cylinder.

Bearing Outer Ring 500 Locking Ring 600

Figure 10:
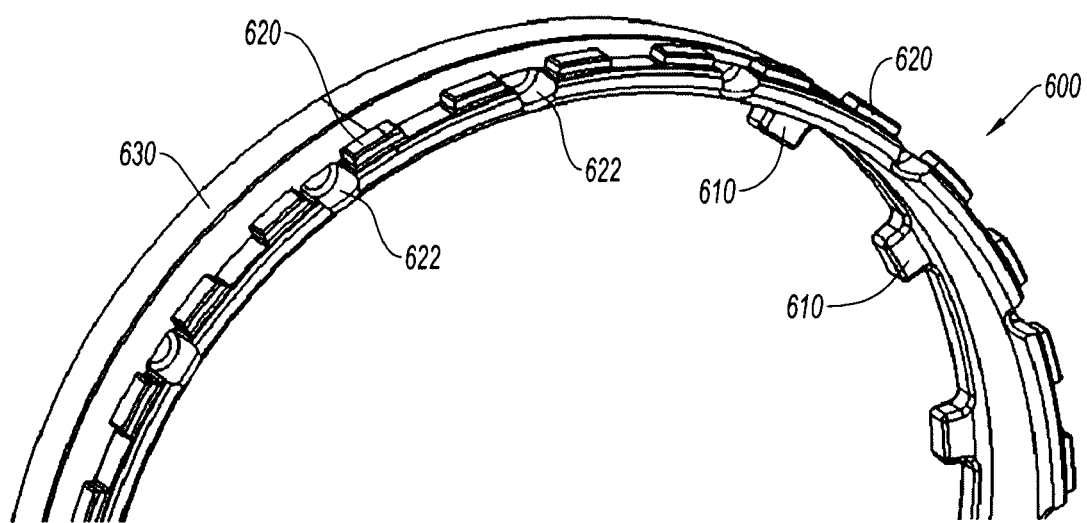
FIG. 10 depicts a perspective view, from the downstream end upstream, of a locking ring according to the invention.
Figure 11:
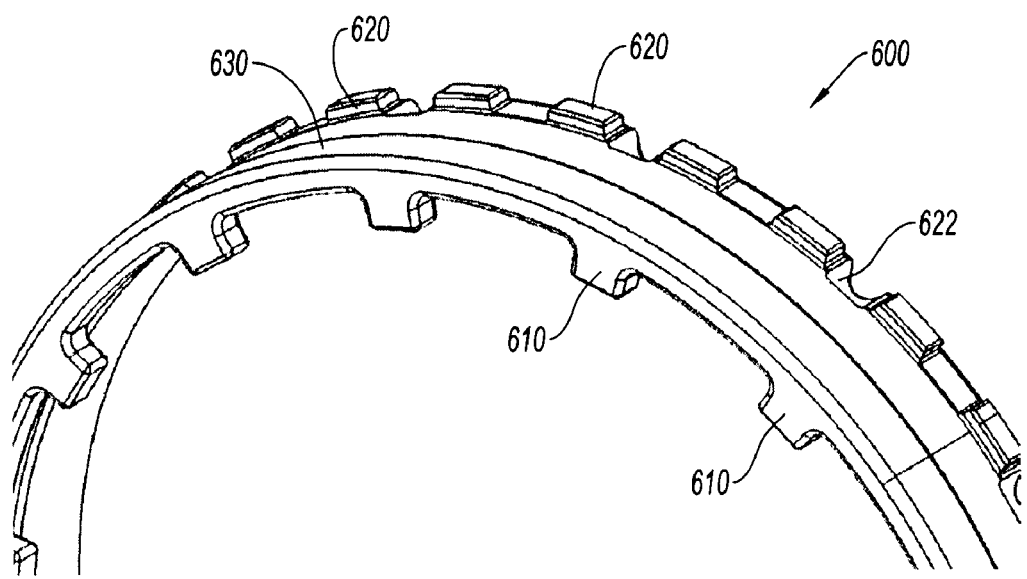
FIG. 11 depicts a perspective view, from the upstream end downstream, of the locking ring of FIG. 10.

With reference to FIGS. 10 and 11, the bearing outer ring 500 locking ring 600 is in the form of an axial annular cylinder mounted on the inside of the bearing support journal 100 and designed to lock the axial position of the bearing outer ring 500. The locking ring 600 is mounted from the rear end of the engine, downstream of the bearing outer ring 500 and of the lubricating ring 300.

The locking ring 600 comprises, upstream, interior radial locking teeth 610 designed to immobilize the bearing outer ring 500 axially and, downstream, exterior radial locking teeth 620 designed to immobilize the lubricating ring 300 axially.

Locking housings 622 intended to accommodate rotation-proofing pins to lock the tangential and axial position of the bearing outer ring 500 are formed in the downstream transverse face of the locking ring 600, between the exterior radial locking teeth 620. In this example, one locking housing 622 is formed every two locking teeth 620 at the circumference of the journal as depicted in FIG. 10.

A cylindrical annular land 630 is formed on the exterior surface of the locking ring 600, the cylindrical land 630 being intended to come into contact with the interior surface of the journal 100.

Annular Immobilizing Ring 700

Figure 12:
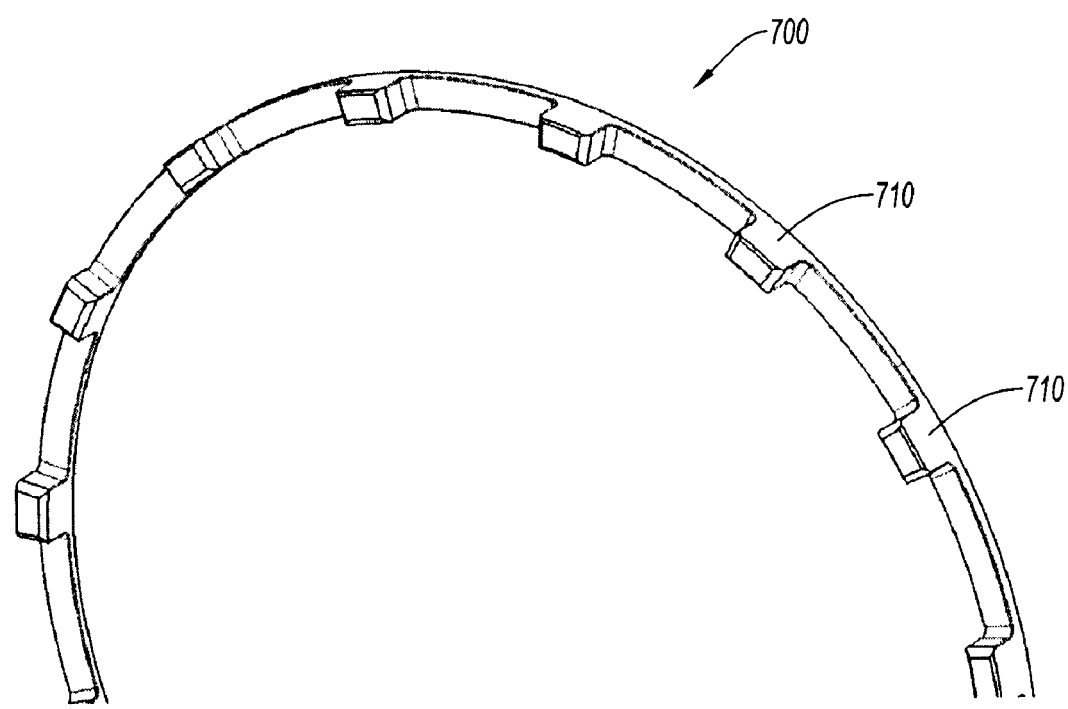
FIG. 12 depicts a perspective view of an immobilizing ring according to the invention.

With reference to FIG. 12, the annular immobilizing ring 700, mounted downstream of the locking ring 600, is designed to fit axially from the rear into the bearing outer ring 500 and comprises upstream-directed axial immobilizing teeth 710, designed to fix the tangential position of the bearing outer ring 500 with respect to the locking ring 600. The axial immobilizing teeth 710 here are formed at equal distances from one another.

Each axial immobilizing tooth 710 of the annular immobilizing ring 700 is inserted between an interior radial locking tooth 610 of the locking ring 600 and a downstream-projecting axial engagement tooth 520 of the outer ring 500. The way in which the annular immobilizing ring 700 is mounted will be detailed later on.

Locknut 800

Figure 13:
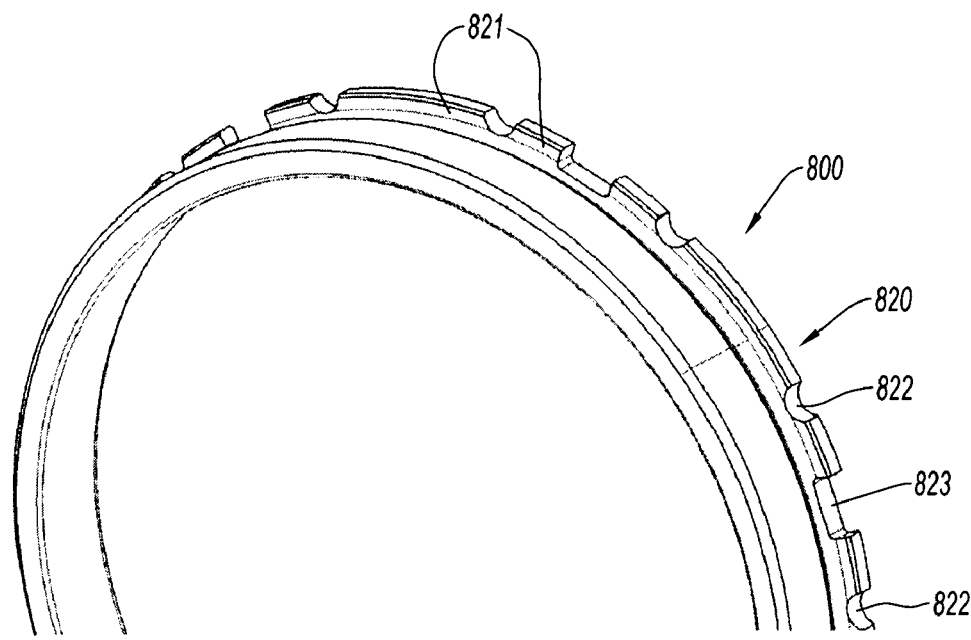
FIG. 13 depicts a perspective view of a locknut according to the invention.

With reference to FIG. 13, the axial locknut 800 is in the form of an axial annular cylinder mounted on the inside of the bearing support journal 100 downstream of the immobilizing ring 700. The locknut 800 is mounted axially from the rear end of the engine.

The axial locknut 800 comprises, at its downstream end, a crenellated annular radial band 820 comprising exterior radial teeth 821 separated by crenels 823. Locking housings 822 are formed here in some crenels 823 to accept rotation-proofing pins that allow the various elements to be indexed as depicted in FIG. 13.

Now that each of the elements has been described in isolation, the successive mounting of each of the elements from the rear end of the engine will now be described.

First, with reference to FIG. 6, the lubricating ring 300 is introduced axially, from the rear end of the engine, inside the journal 100. The exterior surface of the lubricating ring 300 is in contact with the interior face of the journal 100. The upstream end of the lubricating ring 300 is in axial abutment against the lubricating ring flange 133.

Once the lubricating ring 300 has been mounted, the full flange 132 protrudes radially into the journal 100 to form an annular axial end stop of constant thickness.

Figure 14:
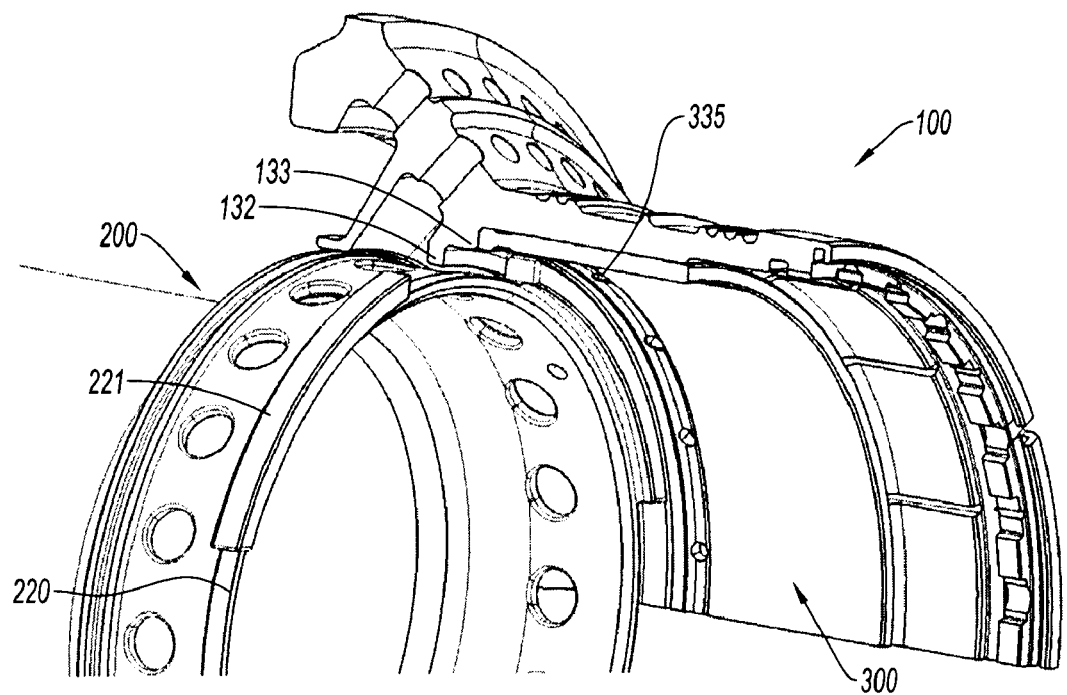
FIG. 14 depicts a perspective view of the sealing sleeve mounted with the lubricating ring and the journal, the journal and the lubricating ring being depicted with cutaway.
Figure 15:
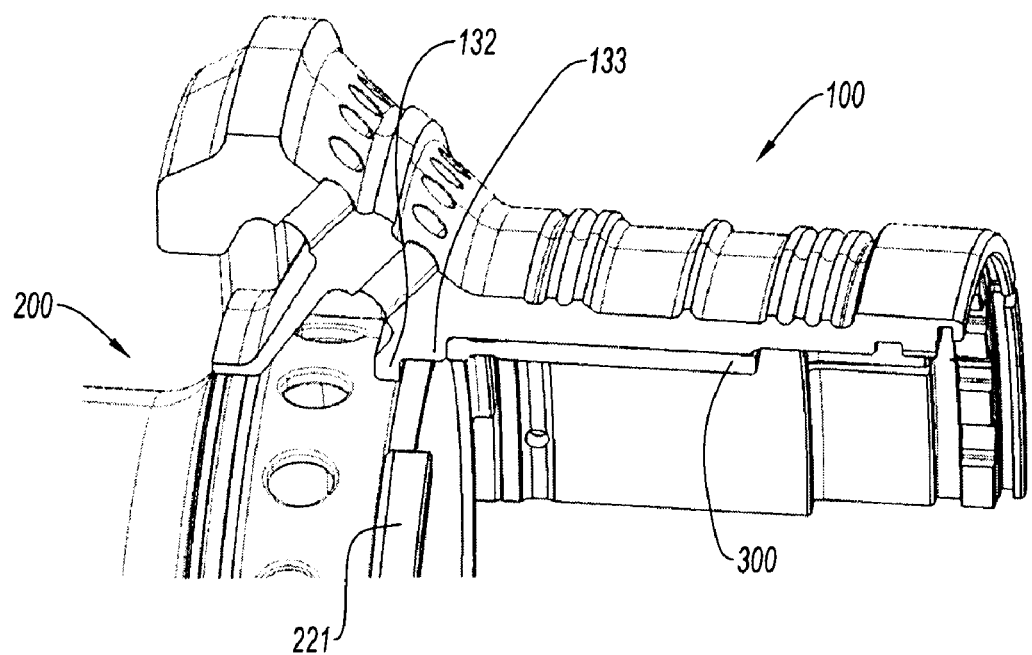
FIG. 15 depicts a close-up view of FIG. 14.

Second, with reference to FIGS. 14 and 15, the sealing sleeve 200 is introduced axially, from the rear end of the engine, into the journal 100, the exterior radial teeth 221 formed upstream of the sleeve 200, coming into axial abutment, along their upstream transverse faces, with the radial annular full flange 132 of the journal, along the downstream transverse face thereof.

The sleeve 200 can no longer move further upstream with respect to the journal 100 (axial immobilization) but remains free to turn about the axis of the engine (tangential freedom).

Figure 16:
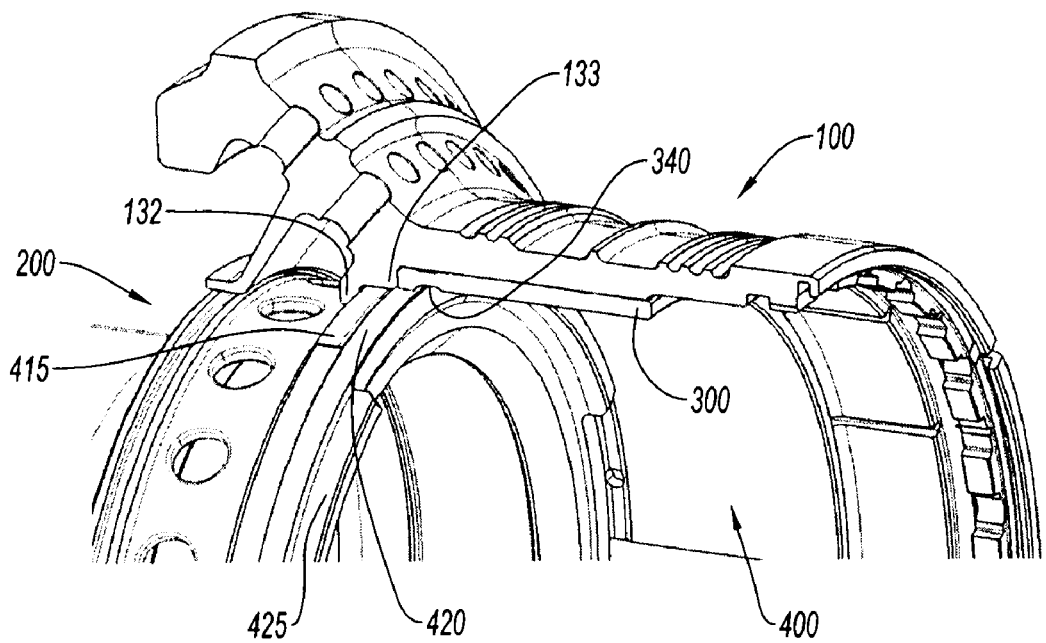
FIG. 16 depicts, in perspective, the sealing disk mounted with the sealing sleeve, the lubricating ring and the journal of FIG. 15.

Third, with reference to FIG. 16, the sealing disk 400 is introduced axially, from the rear of the engine, into the journal 100 on the inside of the lubricating ring 300. Each upstream-projecting axial tooth 415 of the sealing disk 400 engages between two radial teeth 221 of the radial annular band of the sleeve 200 to come into axial abutment against the full flange 132 of the journal 100.

The axial dimension of the upstream-projecting axial teeth 415 of the sealing disk 400 is substantially equal to that of the radial teeth 221 of the radial annular band of the sleeve 200 so that they fit into one another. Likewise, the circumferential dimension of the upstream-projecting axial teeth 415 of the sealing disk 400 is substantially equal to the circumferential dimension of the crenels formed between radial teeth 221 of the radial annular band of the sleeve 200.

Advantageously, when the sealing disk 400 is being introduced into sleeve 200, the teeth of the sleeve 200 and the teeth of the sealing disk 400 come into register with one another and form a substantially continuous full annular band, the axial thickness of which is constant, as depicted in FIG. 16.

In other words, assembling the sleeve 200 with the sealing disk 400 makes it possible to form a continuous axial end stop on the annular full flange 132 of the journal 100. The axial stresses are therefore evenly distributed over the full flange 132.

The exterior surface of the circumferential radial band 420 of the sealing disk 400 is, for its part, pressed against the interior surface of a portion of the lubricating ring 300 extending between the upstream end of said ring 300 and the upstream end of the interior lubricating groove 340. Thus, the interior lubricating groove 340, comprising radial openings 335, is radially aligned with the downstream-projecting axial teeth 425 of the sealing disk 400.

Figure 17:
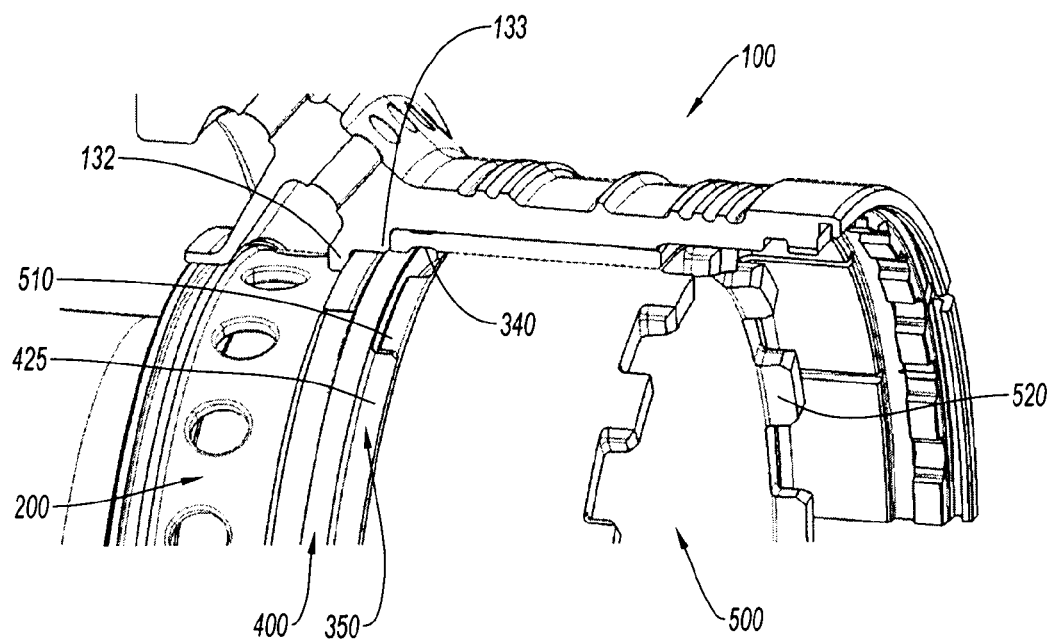
FIG. 17 depicts in perspective, the bearing outer ring mounted with the sealing disk, the sealing sleeve, the lubricating ring and the journal of FIG. 16.

Fourth, with reference to FIG. 17, the bearing outer ring 500 is introduced axially, from the rear end of the engine, into the journal 100, the exterior surface of the bearing outer ring 500 being in contact with the interior surface of the lubricating ring 300.

Each upstream-projecting axial engagement tooth 510 of the bearing outer ring 500 engages between two downstream-projecting axial teeth 425 formed on the circumferential radial band 420 of the sealing disk 400.

The axial dimension of the upstream-projecting axial engagement teeth 510 of the bearing outer ring 500 is substantially equal to that of the axial teeth 425 of the sealing disk 400 so that they can fit into one another. Likewise, the circumferential dimension of the upstream-projecting axial engagement teeth 510 of the bearing outer ring 500 is substantially equal to the circumferential dimension of the crenels, that is to say of the inter-tooth spaces, formed between the axial teeth 425 of the sealing disk 400.

When the bearing outer ring 500 is being introduced into the sealing disk 400, the teeth of the bearing outer ring 500 and the teeth of the sealing disk 400 come into register with one another and form a substantially continuous full annular band, the axial thickness of which is constant. In this example, the radial cutouts are substantially equal in size.

As described above, the upstream axial engagement teeth 510 of the outer ring 500 are set in here with respect to the radial exterior end of the cylinder that embodies the shape of the outer ring 500. The same is true of the axial teeth 425 of the sealing disk 400 with respect to the radial outer end of the circumferential radial band 420 of the sealing disk 400.

In other words, when the bearing outer ring 500 is mounted with the sealing disk 400, the assembly formed by the bearing outer ring 500 and the sealing disk 400 is substantially in the form of an axial annular cylinder having an exterior annular groove 350 formed by the collaboration of the teeth of the bearing outer ring 500 with the teeth of the sealing disk 400 which are set in (see FIG. 17). The upstream and downstream parts of the axial annular cylinder correspond respectively to the sealing disk 400 and to the bearing outer ring 500.

The exterior annular groove 350 thus formed is radially aligned with the interior annular groove 340 formed in the lubricating ring 300. That advantageously makes it possible for a lubricating passage to be formed between said grooves 330, 350 in order to lubricate the bearing.

Figure 18:
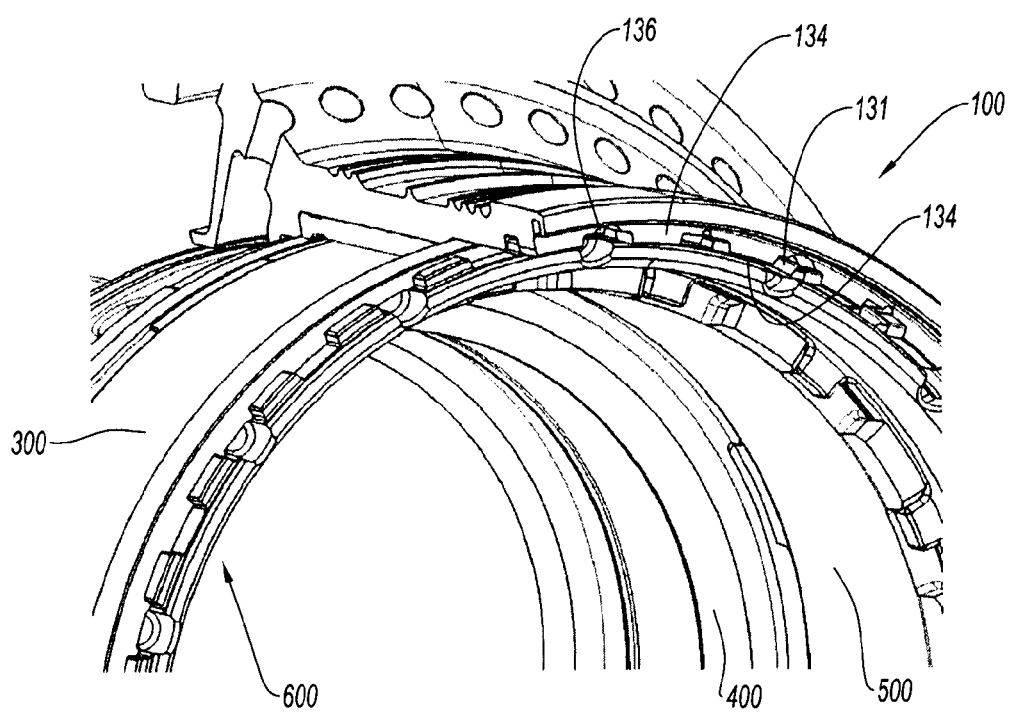
FIG. 18 depicts, in perspective, the locking ring mounted with the bearing outer ring, the sealing disk, the sealing sleeve, the lubricating ring and the journal of FIG. 17.
Figure 19:
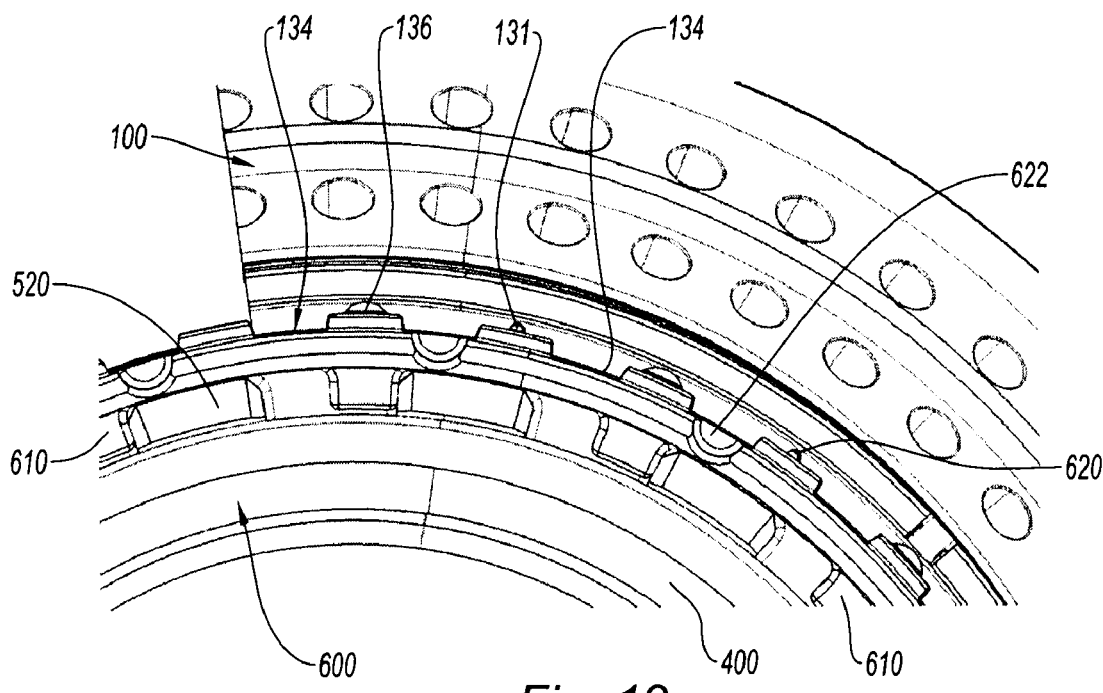
FIG. 19 depicts a view in cross section, from the downstream end upstream, of the elements of FIG. 18.
Figure 20:
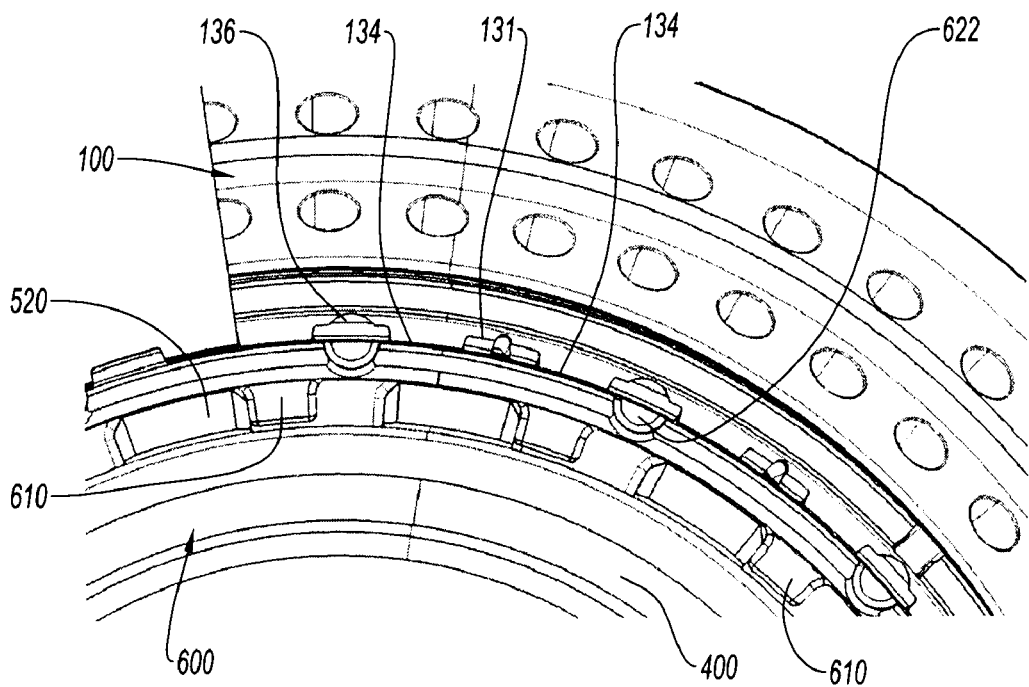
FIG. 20 depicts a view in cross section, from the downstream end upstream, of the elements of FIG. 19 after the outer ring has turned.

Fifth, with reference to FIGS. 18 to 20, the ring 600 that locks the bearing outer ring 500 is mounted axially, from the rear end of the engine, on the inside of the journal 100. The locking ring 600 is mounted downstream of the bearing outer ring 500 and of the lubricating ring 300.

The cylinder that embodies the shape of the locking ring 600 has a diameter greater than the diameter of the cylinder that embodies the shape of the outer ring 500, but smaller than the diameter of the cylinder that embodies the shape of the cylindrical downstream part of the journal 100.

The interior radial locking teeth 610 of the locking ring 600 come into axial abutment with the downstream face of the bearing outer ring 500 between its downstream axial engagement teeth 520. The circumferential dimension of the interior radial locking teeth 610 is less than that of the crenels, that is to say of the inter-tooth spaces, between the downstream axial engagement teeth 520. Thus, the locking ring 600 has some clearance to rotate about the axis of the engine.

As the locking ring 600 is being introduced into the journal 100, the exterior radial locking teeth 620 of the locking ring 600 penetrate the spaces between the interior radial teeth 134 of the upstream crenellated band 135 of the journal 100 as depicted in FIG. 19. The exterior radial locking teeth 620 of the locking ring 600 are in axial abutment with the downstream face of the lubricating ring 300.

With reference to FIG. 20, the locking ring 600 is rotationally driven about the axis of the motor in the counterclockwise direction so that the exterior radial locking teeth 620 of the locking ring 600 pass "behind" the interior radial locking teeth 134 of the upstream crenellated band 135 of the journal 100. In other words, the downstream face of the exterior radial locking teeth 620 of the locking ring 600 is in contact with the upstream face of the interior radial teeth 134 of the immobilizing band 135 of the journal 100.

After rotation, and still with reference to FIG. 20, the locking housings 622 formed in the downstream transverse face of the locking ring 600 between the exterior radial locking teeth 620 are axially aligned with the crenels 131 of the crenellated radial annular immobilizing band 135 of the journal 100 in which housings 136 for rotation-proofing pins are formed.

Figure 21:
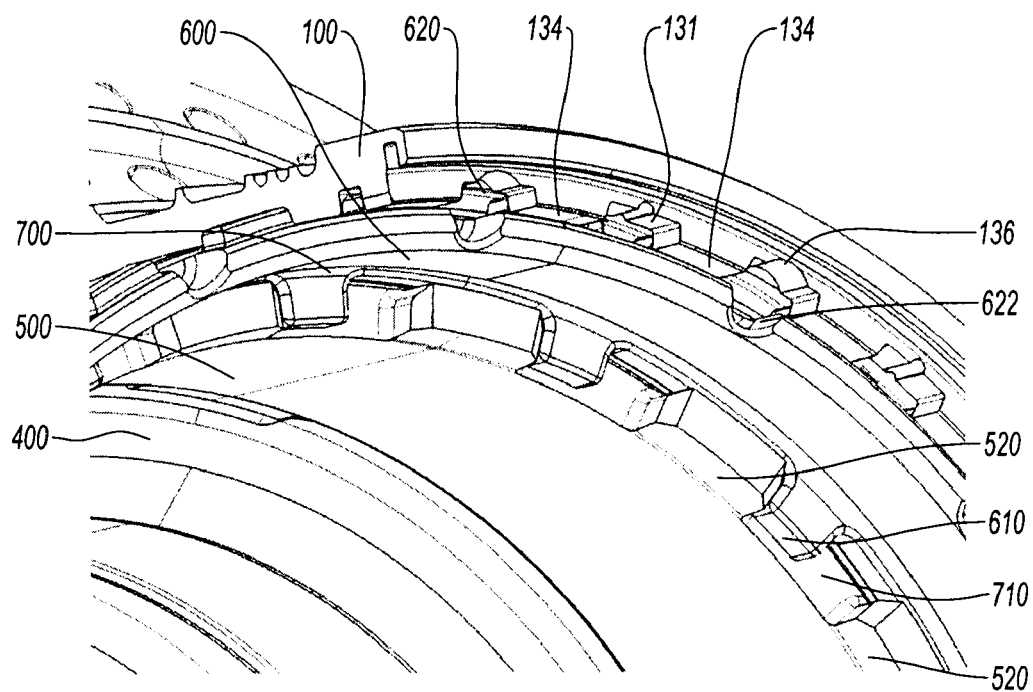
FIG. 21 depicts, in perspective, the immobilizing ring mounted with the locking ring, the bearing outer ring, the sealing disk, the sealing sleeve, the lubricating ring and the journal of FIG. 18.
Figure 22:
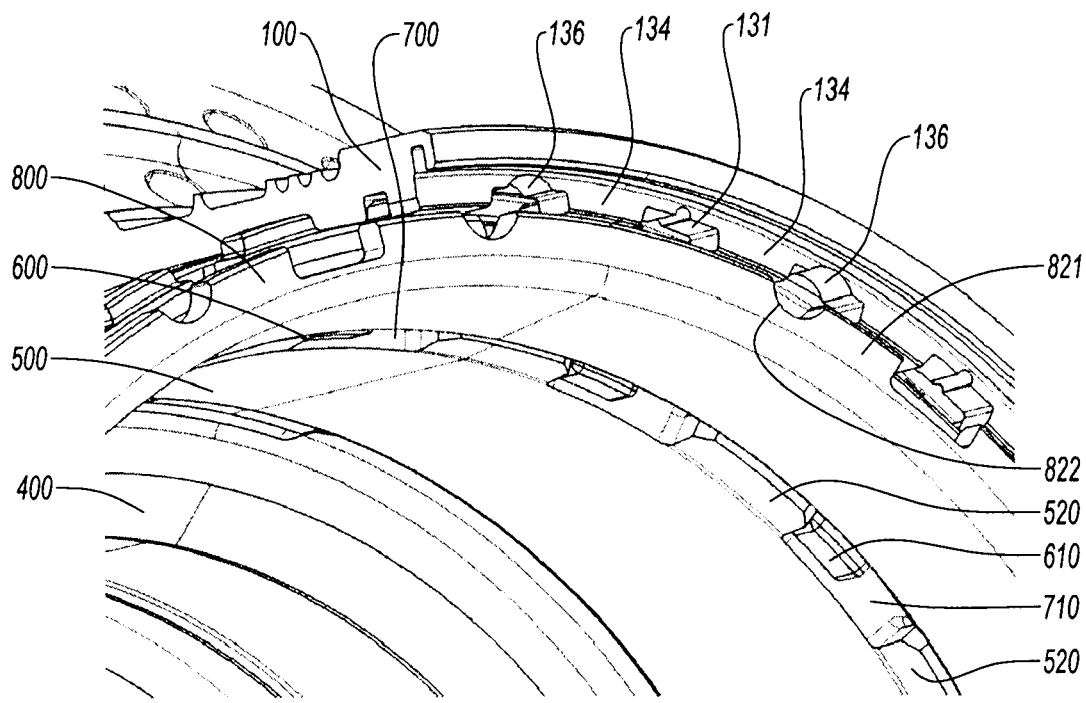
FIG. 22 depicts, in perspective, the locknut mounted with the immobilizing ring, the locking ring, the bearing outer ring, the sealing disk, the sealing sleeve, the lubricating ring and the journal of FIG. 21.

Sixth, with reference to FIGS. 21 to 22, the annular immobilizing ring 700 is introduced axially, from the rear end of the engine, inside the journal 100. Each axial immobilizing tooth 710 of the annular immobilizing ring 700 becomes inserted between an interior radial locking tooth 610 of the locking ring 600 and a downstream-projecting axial engagement tooth 520 of the outer ring 500. Mounting the annular immobilizing ring 700 makes it possible to eliminate the clearance that the locking ring 600 has to rotate about the axis of the engine. The circumferential dimension of the immobilizing teeth 710 of the immobilizing ring 700 is here designed to fill the circumferential space formed between an interior radial locking tooth 610 of the locking ring 600 and a downstream-projecting axial engagement tooth 520 of the outer ring 500.

Seventh, still with reference to FIGS. 21 to 22, the axial locknut 800 is introduced axially, from the rear end of the engine, into the journal 100 downstream of the immobilizing ring 700.

The locknut 800 is introduced into the journal 100 in the cold state. Because of thermal expansion, the locknut 800 expands transversely, the exterior radial teeth 821 of the nut 800 pressing against the interior surface of the journal 100. Further, the nut 800 will axially restrain all of the elements mounted between the full flange 132 formed upstream of the journal 100 and said locknut 800.

The number of locking housings 822 formed between the exterior radial teeth 821 of the locknut 800 is greater by one than the number of locking housings 622 formed in the locking ring 600. Thus, there is always a position in which a locking housing 822 formed between an exterior radial tooth 821 of the locknut 800 is axially aligned with a locking housing 622 formed in the locking ring 600, which is itself axially aligned with a locking housing 136 formed in the journal 100.

Figure 23:
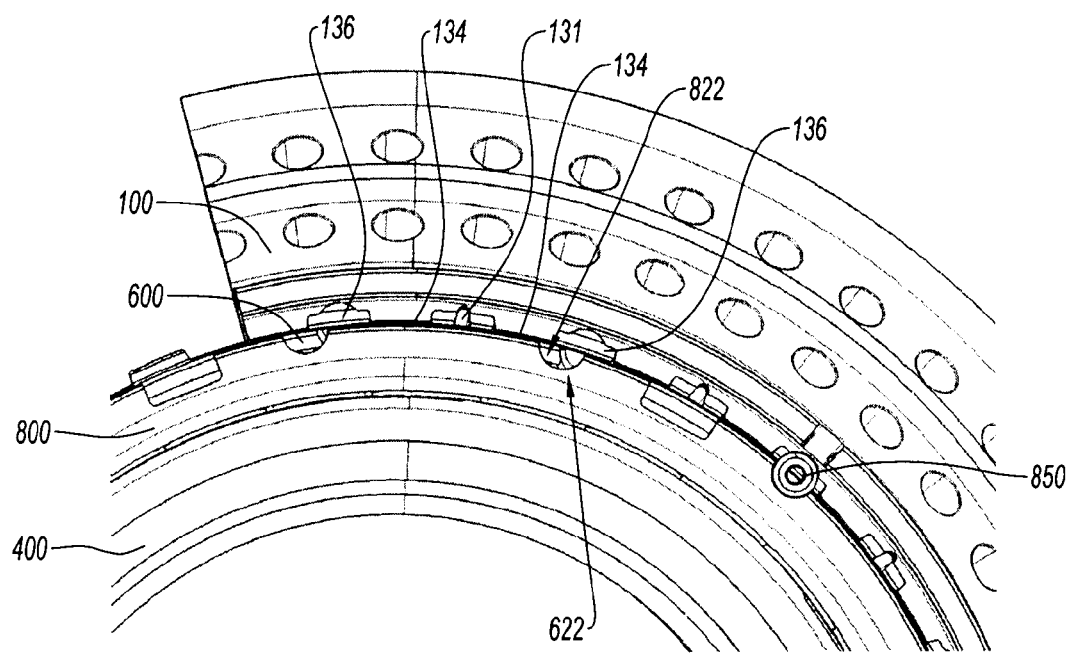
FIG. 23 depicts a view in cross section, from the downstream end upstream, of the elements of FIG. 22.

With reference to FIG. 23, a rotation-proofing pin 850 is inserted longitudinally between the locking housings 622, 136, 822 of the locking ring 600, of the journal 100 and of the locknut 800 in order to immobilize tangentially all of the elements mounted with the journal 100.

Figure 24:
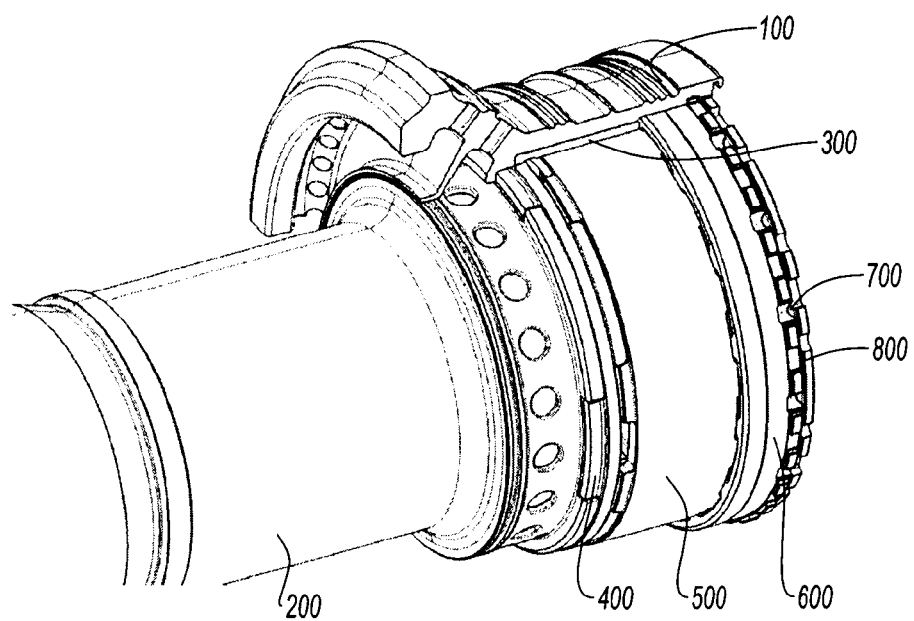
FIG. 24 depicts a perspective view of all the elements of FIG. 23.

Thus, as can be seen from FIGS. 24 and 25, all the elements 200-800 are immobilized on the journal 100 both axially and tangentially. Tangential immobilization, advantageously offset toward the downstream end of the journal 100, makes it possible to reduce the mechanical stresses near the full flange 132 of the journal 100 and thus increase its life.

The bearing outer ring 500 described here is one that is mounted on the inside of a lubricating ring 300, and is independent thereof. It goes without saying that the bearing outer ring 500 and the lubricating ring 300 could be mounted as a single same module or be in the form of a single element. The lubricating ring 300 may be incorporated into the bearing outer ring 500.

The invention claimed is:

1. A bearing support journal for an internal shaft of a gas turbine engine comprising a means of retaining a sealing sleeve surrounding said shaft, the retaining means comprising:
    a full radial annular flange formed upstream on an axial cylindrical part of the journal, said full flange being intended to butt axially against a radial annular flange of the sealing sleeve, said full flange extending radially inwardly with a radial dimension which is substantially constant at a circumference of the journal; and
    tangential immobilizing means formed at a downstream end of the axial cylindrical part of the journal and intended to immobilize the sealing sleeve tangentially with respect to the journal, the tangential immobilizing means being formed downstream of the full flange.

2. The journal as claimed in claim 1, wherein the tangential immobilizing means are in the form of a crenellated radial annular immobilizing band formed in an interior surface of the journal, said band comprising inwardly directed radial teeth alternating with crenels.

3. The journal as claimed in claim 2, wherein locking housings are formed in the crenels of said immobilizing band of the journal.

4. The journal as claimed in claim 1, comprising bearing lubricating ducts, wherein the lubricating ducts are in the form of longitudinal slots formed in the interior surface of the journal.

5. The journal as claimed in claim 4, wherein radial lubricating bores are formed in the interior surface of the journal at an upstream end of the lubricating ducts.

6. A gas turbine engine comprising a journal as claimed in claim 1.

7. An assembly comprising:
    a bearing support journal for an internal shaft of a gas turbine engine comprising a means of retaining a sealing sleeve surrounding said shaft, the retaining means comprising a full radial annular flange formed upstream on an axial cylindrical part of the journal, said full flange being intended to butt axially against a radial annular flange of the sealing sleeve, and tangential immobilizing means created downstream on the axial cylindrical part of the journal and intended to immobilize the sealing sleeve tangentially with respect to the journal;

a sealing sleeve comprising a radial annular flange; and a lubricating ring in surface contact with an interior surface of the journal, which is in axial abutment, along its upstream edge, with a radial annular axial-thrust flange formed on the journal.

8. The assembly as claimed in claim 7, wherein the lubricating ring comprises an annular oil-collecting groove in which radial openings are formed.

9. The assembly as claimed in claim 7, wherein the lubricating ring comprises cylindrical lands to deaden the vibrations of the engine in operation.

10. The assembly as claimed in claim 7, comprising a sealing disk, of cylindrical shape, that fits axially into the sealing sleeve downstream thereof, the sealing disk comprising a circumferential radial band comprising upstream-projecting axial teeth which are inserted into openings formed in the radial annular flange of the sealing sleeve.

11. The assembly as claimed in claim 10, wherein the sealing disk is mounted on the inside of the lubricating ring.

12. The assembly as claimed in claim 10, comprising an external bearing ring, of cylindrical shape, that fits axially into the sealing disk downstream thereof, the external bearing ring comprising upstream-projecting axial engagement teeth which are engaged between the downstream-projecting axial engagement teeth formed on the circumferential radial band of the sealing disk.

13. The assembly as claimed in claim 12, wherein the external bearing ring is mounted on an inside of the lubricating ring.

14. The assembly as claimed in claim 13, wherein the lubricating ring is built into the external bearing ring.

15. The assembly as claimed in claim 12, comprising a locking ring for locking the external bearing ring, of cylindrical shape, that fits axially into the external bearing ring, downstream thereof, mounted on an inside of the bearing support journal in order to lock the axial position of the external bearing ring.

16. The assembly as claimed in claim 15, wherein the locking ring comprises, upstream, interior radial locking teeth that axially immobilize the external bearing ring and, downstream, exterior radial locking teeth that axially immobilize the lubricating ring.

17. The assembly as claimed in claim 16, wherein locking housings intended to accommodate rotation-proofing pins to lock the tangential position of the external bearing ring are formed in the downstream transverse face of the locking ring.

18. The assembly as claimed in claim 15, comprising an annular immobilizing ring, of cylindrical shape, that fits axially into the external bearing ring downstream thereof, the immobilizing ring comprising upstream-directed axial immobilizing teeth designed to fix a tangential position of the external bearing ring with respect to the locking ring.

19. The assembly as claimed in claim 18, wherein the external bearing ring comprises on its downstream face downstream-projecting axial engagement teeth, each axial immobilizing tooth of the annular immobilizing ring being inserted between an interior radial locking tooth of the locking ring and a downstream-projecting axial engagement tooth of the external bearing ring.

20. The assembly as claimed in claim 18, comprising an axial locknut in axial abutment with the downstream face of the immobilizing ring.

21. A gas turbine engine comprising an assembly as claimed in claim 7.

* * * * *